(12) United States Patent
Sunkavalli (10) Patent No.: US 10,297,045 B2
(45) Date of Patent: May 21, 2019

(54) FAST INTRINSIC IMAGES

(71) Applicant: Adobe Inc., San Jose, CA (US)

(72) Inventor: Kalyan K. Sunkavalli, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/546,934

(22) Filed: Nov. 18, 2014

(65) Prior Publication Data

US 2016/0140722 A1 May 19, 2016

(51) Int. Cl.
*G06K 9/00* (2006.01)
*G06T 7/90* (2017.01)
*G06T 7/11* (2017.01)

(52) U.S. Cl.
CPC ............... *G06T 7/90* (2017.01); *G06T 7/11* (2017.01); *G06T 2207/10024* (2013.01); *G06T 2207/20016* (2013.01)

(58) Field of Classification Search
CPC ......... G06T 7/0081; G06T 7/408; G06T 5/20; G06T 2207/10024; H04N 19/59
USPC ........................................ 382/162, 164, 167
See application file for complete search history.

(56) References Cited

U.S. PATENT DOCUMENTS

| | | | | |
|---|---|---|---|---|
| 2004/0032261 A1* | 2/2004 | Schweikard | ..... | G01R 33/56527 324/309 |
| 2011/0150338 A1* | 6/2011 | Smith | ................. | G06K 9/4652 382/190 |
| 2012/0026339 A1* | 2/2012 | Kojima | ................ | H04N 5/2256 348/164 |
| 2014/0072210 A1* | 3/2014 | Stein | .................... | G06K 9/4661 382/162 |
| 2015/0254810 A1* | 9/2015 | Heidrich | ................ | H04N 9/045 382/167 |

OTHER PUBLICATIONS

Bousseau, Adrien, Sylvain Paris, and Frédo Durand. "User-assisted intrinsic images." ACM Transactions on Graphics (TOG). vol. 28. No. 5. ACM, 2009.*
Barron, et al., "Color constancy, intrinsic images, and shape estimation", ECCV, 2012, 2012, 14 pages.
Barrow, et al., "Recovering Intrinsic Scene Characteristics from Images", In Comp. Vision Sys, 1978, Apr. 1978, 23 pages.
Bousseau, et al., "User-Assisted Intrinsic Images", ACM Transaction on Graphics, vol. 28, No. 5, Oct. 2009, 10 pages.
Finlayson, et al., "On the Removal of Shadows From Images", IEEE Trans. Pattern Anal. Mach. Intell. 28, 1, 2006, 11 pages.
Grosse, et al., "Ground truth dataset and baseline evaluations for intrinsic image algorithms", In ICCV 2009, 2009, 8 pages.

(Continued)

*Primary Examiner* — Andrew M Moyer
(74) *Attorney, Agent, or Firm* — SBMC (57) ABSTRACT

Fast intrinsic images techniques are described. In one or more implementations, a combination of local constraints on shading and reflectance and non-local constraints on reflectance are applied to an image to generate a linear system of equations. The linear system of equations can be solved to generate a reflectance intrinsic image and a shading intrinsic image for the image. In one or more implementations, a multi-scale parallelized iterative solver is used to solve the linear system of equations to generate the reflectance intrinsic image and the shading intrinsic image.

20 Claims, 7 Drawing Sheets

(56) References Cited

OTHER PUBLICATIONS

Land, et al., "Lightness and Retinex Theory", Journal of the Optical Society of America, vol. 61, No. 1, Jan. 1971, 11 pages.
Omer, et al., "Color Lines: Image Specific Color Representation.", In CVPR, 2004, 8 pages.
Shen, et al., "Intrinsic image decomposition with non-local texture cues", In CVPR, 2008, 7 pages.
Tappen, et al., "Recovering Intrinsic Images from a Single Image", IEEE Trans. PAMI 27, 9, Sep. 2005, 8 pages.

* cited by examiner

FAST INTRINSIC IMAGES

BACKGROUND

The intensity observed at any pixel in an image is the result of the lighting in the photograph interacting with the color of the surface at that pixel. Explicitly uncoupling these two elements, often referred to as the reflectance and shading intrinsic images, can enable a number of image editing operations including recoloring, retexturing, and re-lighting. However, separating a single image into its reflectance and shading is a highly unconstrained problem.

SUMMARY

Fast intrinsic images techniques are described. In one or more implementations, a combination of local constraints on shading and reflectance and non-local constraints on reflectance are applied to an image to generate a linear system of equations. The linear system of equations can be solved to generate a reflectance intrinsic image and a shading intrinsic image for the image. In one or more implementations, a multi-scale parallelized iterative solver is used to solve the linear system of equations to generate the reflectance intrinsic image and the shading intrinsic image.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Images are formed as a result of a complex interaction between the lighting in a scene, and the geometry and material properties of the objects in the scene. Inverting the image formation process to recover all these factors is an open problem. *Recovering Intrinsic Scene Characteristics*, by H. Barrow and J. Tenenbaum, in Computer Vision Systems, 1978 proposed that distinct scene properties could be represented as separate components called "intrinsic images". One such intrinsic image decomposition that has become very popular recently is the separation of a single image into a reflectance intrinsic image and a shading intrinsic image.

The reflectance intrinsic image captures the colors of the objects in the scene, and can be thought of as the image that would be formed if only the base material properties of a scene were observed without the effect of lighting. In contrast, the shading intrinsic image captures the effect of the lighting interacting with the geometry of the scene with the color and materials of the scene not playing any role. In other words, the shading intrinsic image captures what the scene would look like if every object was painted with the same shade of gray.

Multiplying these two intrinsic images reproduces the original image, for example $I(p)=R(p)S(p)$, where $I(p)$ denotes the observed intensity at pixel p, and $R(p)$ and $S(p)$ denote the reflectance and shading at that pixel, respectively. The form of this equation makes the difficulty of separating a single image into its reflectance and shading clear: there exists an infinite pair of reflectance and shading intrinsic images that can be combined to form the same image. For example, a red pixel value could be the result of bright red object being lit by a dark white light, or a dark white object being lit by a bright red light, and so forth.

Because of the inherent ambiguity of this decomposition, conventional intrinsic image techniques use priors on the reflectance and the shading to constrain the values that they can take. For example, *Lightness and Retinex Theory*, by E. H. Land, John, and J. Mccann, in Journal of the Optical Society of America 61, 1-11, 1971, assumed that the reflectance is a piecewise constant and that the shading varies smoothly. This assumption was the basis of their Retinex algorithm that separates image gradients into reflectance and shading gradients by thresholding them so that large gradients are assigned to the reflectance, while small gradients are considered to be caused by the shading. This technique forms the basis of a number of conventional intrinsic image algorithms. However, many conventional solutions for determining reflectance and shading intrinsic images are slow and processor-intensive.

Fast intrinsic images techniques are described. In one or more implementations, a combination of local constraints on shading and reflectance and non-local constraints on reflectance are applied to an image to generate a linear system of equations. The local constraints are applied between a pixel of the image and neighboring pixels (e.g., top, left, right, and bottom pixels), while the non-local constraints are applied between each pixel of the image and pixels in a set of pixels. The linear system of equations can be solved to generate a reflectance intrinsic image and a shading intrinsic image for the image.

In one or more implementations, a multi-scale parallelized iterative solver module is used to solve the linear system of equations to generate the reflectance and shading intrinsic images. The multi-scale iterative solver module is up to two orders of magnitude faster than using a direct linear solver. For example, conventional solvers may take 20 seconds to generate the reflectance and shading intrinsic images, whereas the multi-scale iterative solver module takes less than 2 seconds to solve the linear system of equations. Additionally, the multi-scale iterative solver scales linearly with an increase in image resolution, as opposed to direct linear solvers which scale quadratically.

Example Environment

Figure 1:
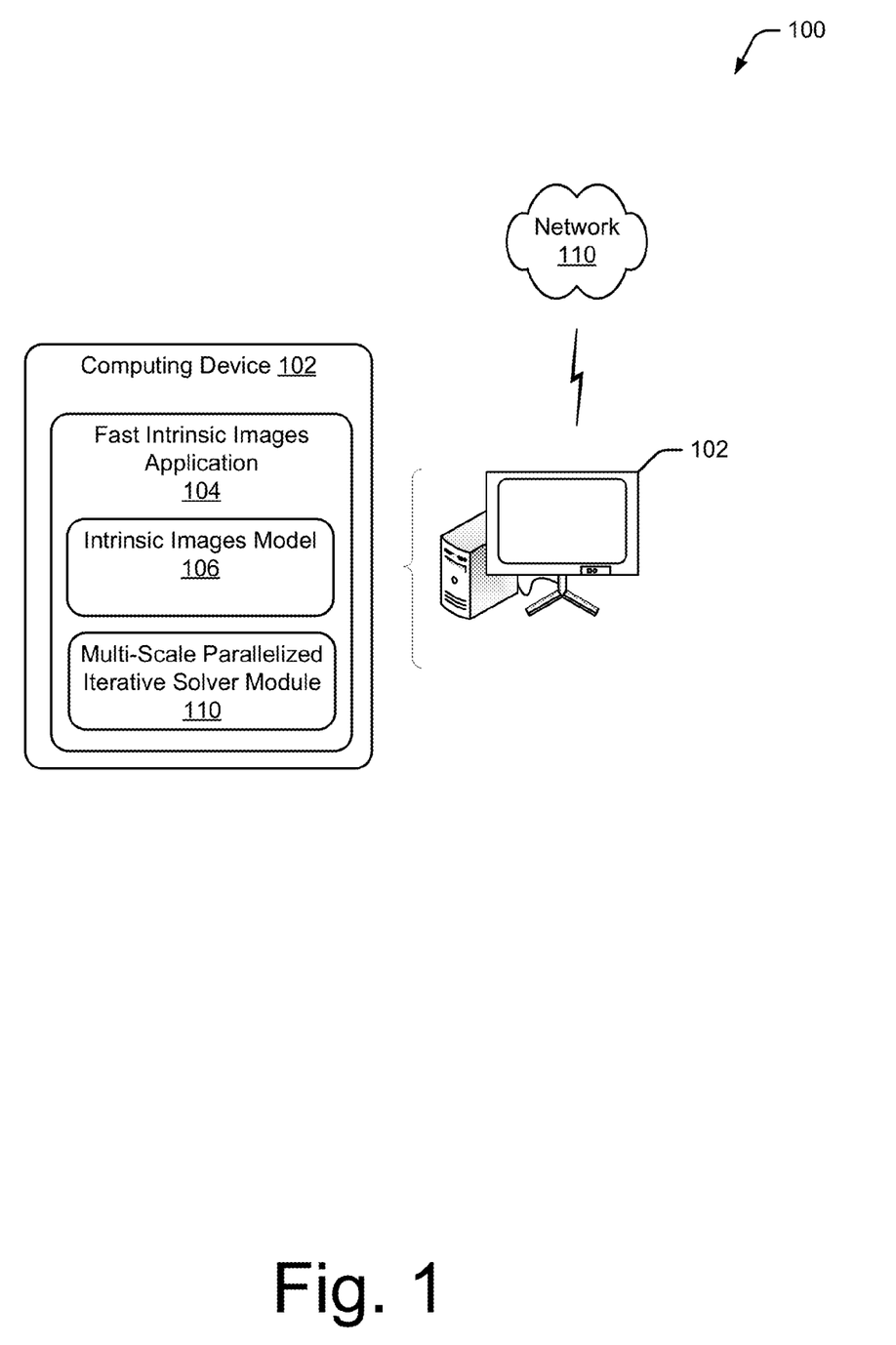
FIG. 1 illustrates an environment in an example implementation that is operable to employ techniques described herein.

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

Computing device 102 is illustrated as including fast intrinsic images application 104 that is representative of functionality to perform one or more techniques to generate a reflectance intrinsic image and a shading intrinsic image for an image.

Fast intrinsic images application 104 may include an intrinsic images model 106 and/or a multi-scale parallelized iterative solver module ("solver module") 108. Intrinsic images model 106 is representative of local and non-local constraints that can be constructed and applied to an image to generate a linear system of equations that can be solved to generate the reflectance and shading intrinsic images. Further discussion of intrinsic images model 106 can be found in FIG. 3.

Solver module 108 is representative of functionality to solve the linear system of equations to generate the reflectance and shading intrinsic images for the image. Further discussion of multi-scale iterative solver module 108 can be found in FIG. 4.

Figure 7:
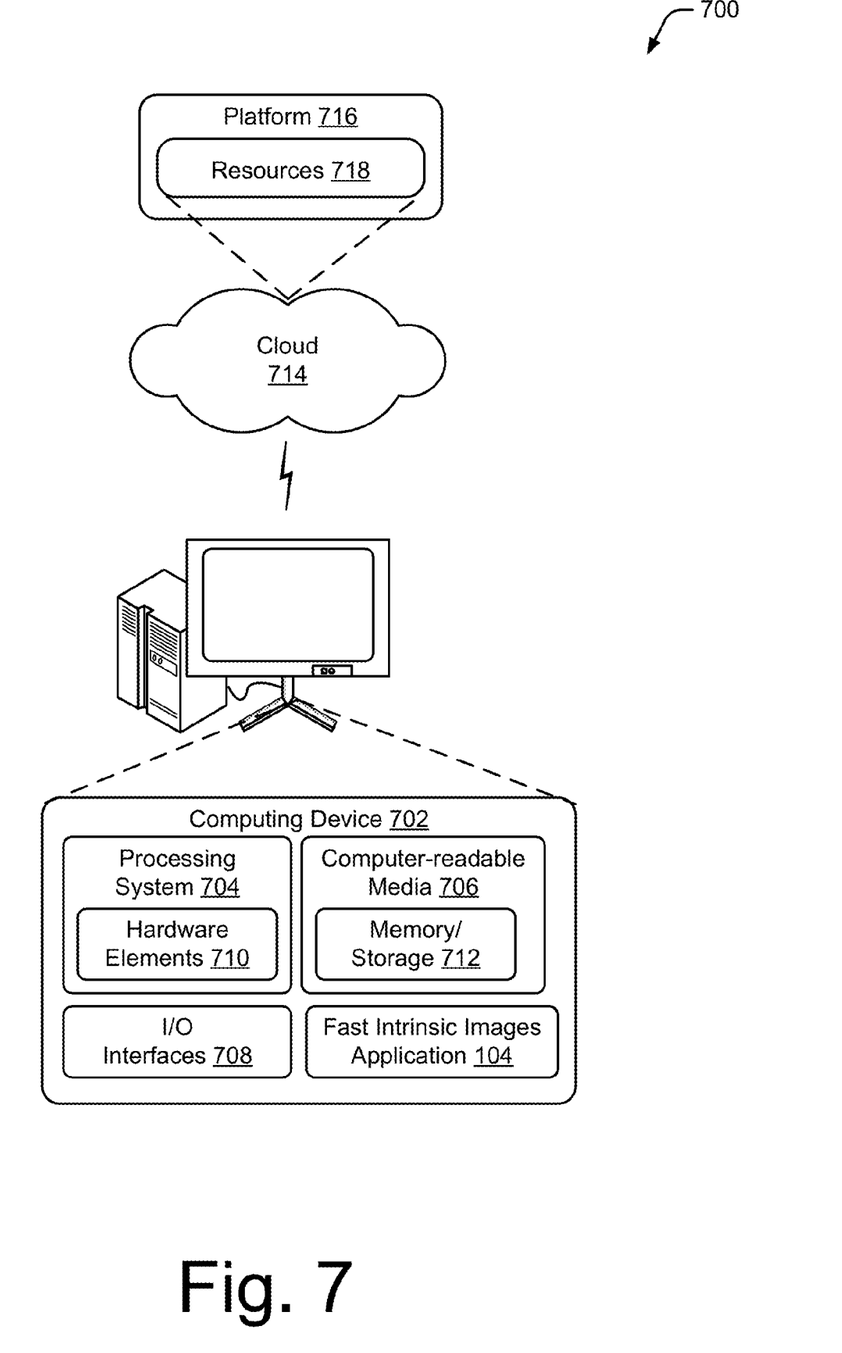
FIG. 7 illustrates an example system that includes an example computing device that is representative of one or more computing systems and/or devices that may implement the various techniques described herein.

Although illustrated as part of computing device 102, functionality of the fast intrinsic images application may also be implemented in a distributed environment, remotely via a network 110 (e.g., "over the cloud") as further described in relation to FIG. 7, and so on. Although network 110 is illustrated as the Internet, the network may assume a wide variety of configurations. For example, network 110 may include a wide area network (WAN), a local area network (LAN), a wireless network, a public telephone network, an intranet, and so on. Further, although a single network 110 is shown, network 110 may also be configured to include multiple networks.

Figure 2:
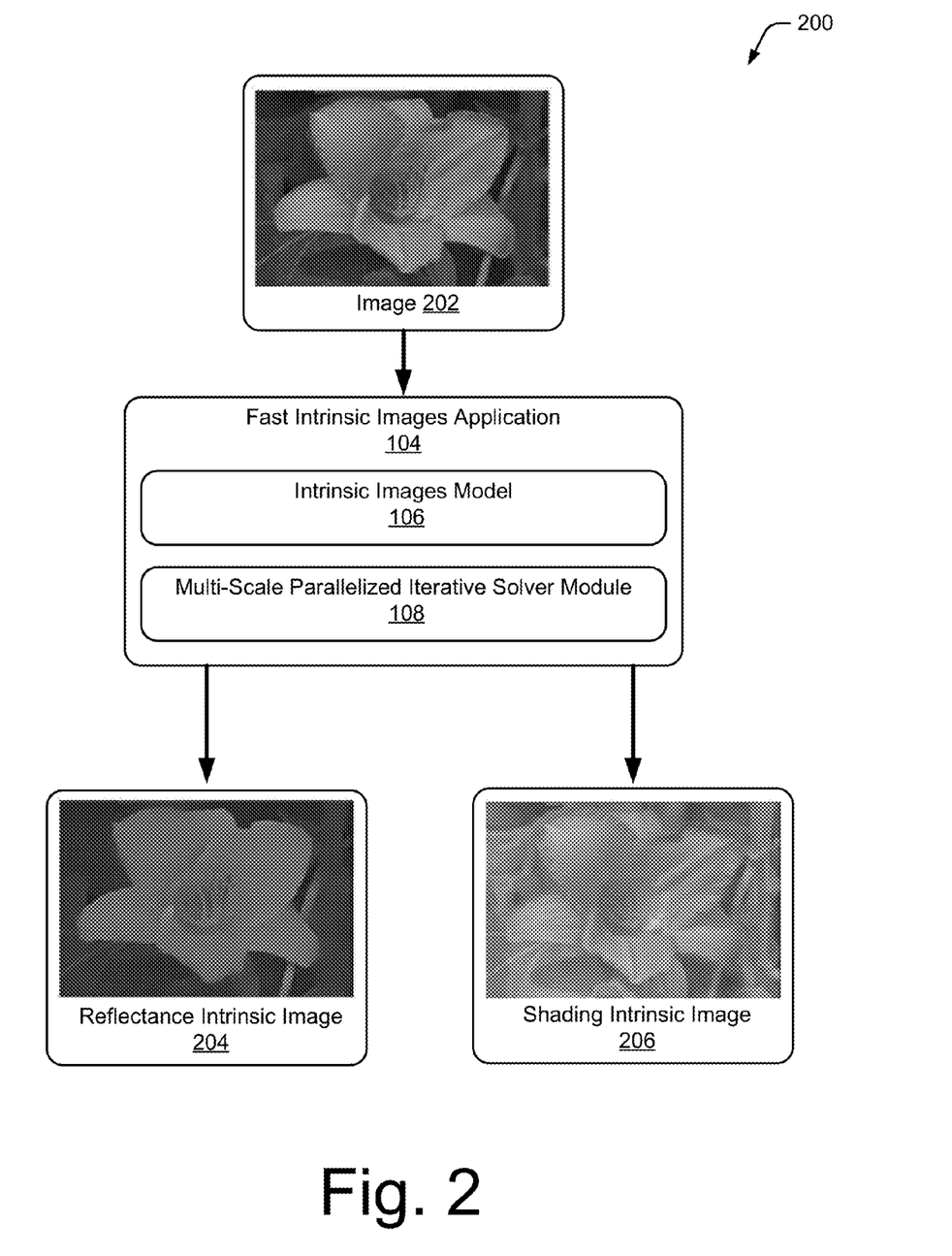
FIG. 2 illustrates a system in an example implementation in which a fast intrinsic images application generates a reflectance intrinsic image and a shading intrinsic image from an image.

FIG. 2 illustrates a system 200 in an example implementation in which fast intrinsic images application 104 of FIG. 1 generates a reflectance intrinsic image and a shading intrinsic image from an image.

To begin, fast intrinsic images application 104 receives an image 202. In this example, image 202 is illustrated as a picture of a flower. For purposes of this discussion, assume that the flower of image 202 includes green leaves and pink petals.

Responsive to receiving image 202, fast intrinsic images application 104 applies intrinsic images model 106 to image 202, which includes a combination of local constraints on shading and reflectance and non-local constraints on reflectance, to generate a linear system of equations. Then, solver module 108 solves the linear system of equations in order to generate a reflectance intrinsic image 204 and a shading intrinsic image 206 for image 202.

Reflectance intrinsic image 204 captures the colors of the objects (e.g., the flower) in image 202, and can be thought of as the image that would be formed if only the base material properties of a scene were observed without the effect of lighting. Thus, in reflectance intrinsic image 204, the shading and geometry of the flower are removed, but the petals of the flower are still pink and the leaves are still green.

In contrast, shading intrinsic image 206 captures the effect of the lighting interacting with the geometry of the objects (e.g., the flower) in image 202, with the color and materials of the scene not playing any role. In other words, the reflectance intrinsic image captures what the scene would look like if every object was painted with the same shade of gray. Thus, in shading intrinsic image 206, the pink and green coloring of the flower are removed, but the shading and geometry of the flower remain.

Separating image 202 into reflectance intrinsic image 204 and shading intrinsic image 206 enables a variety of different image editing operations, such as recoloring, retexturing, re-lighting, and so forth. For example, a user can now easily change the color of the petals of the flower in image 202 from pink to a different color, such as purple, by coloring the petals of the flower in reflectance intrinsic image 204 purple. Since the shading is removed from reflectance intrinsic image 204, the shading and the shadows of image 202 will be preserved as the petals are colored. Then, the edited reflectance intrinsic image 204, with purple petals, and can be combined with shading intrinsic image 206 to generate an image of the flower with purple petals, and the shading and lighting will look correct.

Intrinsic Image Model

As discussed above, multiplying the reflectance intrinsic image and the shading intrinsic image reproduces the original image, for example $I(p)=R(p)S(p)$, where $I(p)$ denotes the observed intensity at pixel p, and $R(p)$ and $S(p)$ denote the reflectance and shading at that pixel, respectively. The form of this equation makes the difficulty of separating a single image into its reflectance and shading clear: there exist an infinite pair of reflectance and shading intrinsic images that can combined to form the same image. For example, a red pixel value could be the result of bright red object being lit by a dark white light, or a dark white object being lit by a bright red light, and so on and so forth.

Thus, in one or more implementations, the intrinsic images algorithm can be linearized by taking the log of the equation $I(p)=R(p)S(p)$, which results in the following equation: $i(p)=r(p)+s(p)$, where $f=\log(F)$.

Another advantage of this equation is that that $R(p)$ and $S(p)$ are strictly positive and ensuring this will lead to a constrained optimization problem that is more difficult to solve. However, $r(p)$ and $s(p)$ can take any real value, each of which will be mapped to positive values for $R(p)$ and $S(p)$), which enables the use of unconstrained optimization techniques.

However, this equation by itself, is still under-constrained because RGB reflectance and shading intrinsic images correspond to six unknowns at every pixel, while only three equations result from the observed RGB pixel values.

In one or more implementations, to make the problem more tractable, intrinsic images model 106 assumes that shading of image 202 is grayscale (with one exception discussed later). This is typically a good assumption for images where the lighting is the same color everywhere and the shading captures the intensity of the lighting at every pixel.

With this assumption, intrinsic images model 106 can solve for an RGB reflectance intrinsic image and a grayscale shading intrinsic image, which is a total of four unknown values at every pixel of image 202. However, the equation is still under-constrained.

Thus, in accordance with one or more implementations, intrinsic images model 106 includes local constraints for reflectance and shading and non-local constraints for reflectance in order to generate a linear system of equations which can be solved to generate reflectance intrinsic image 204 and shading intrinsic image 206.

Figure 3:
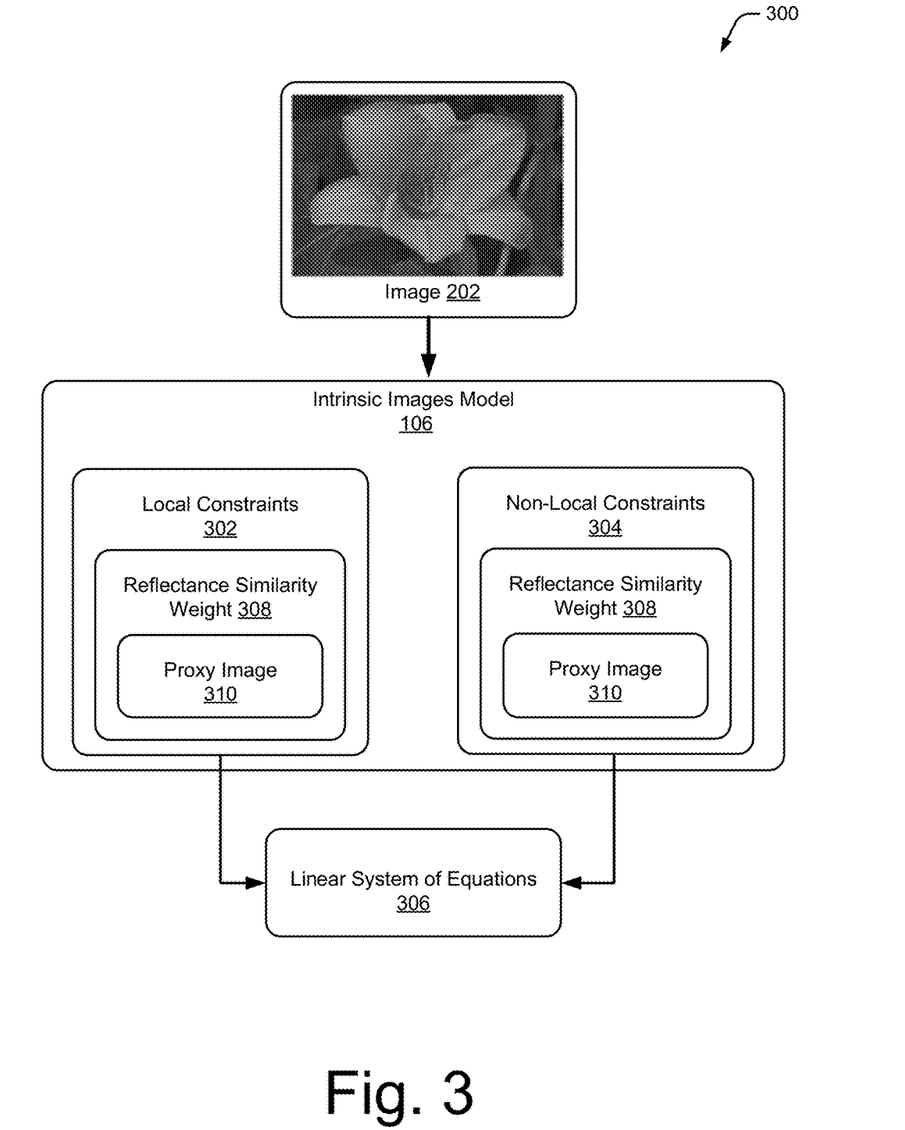
FIG. 3 illustrates an example of applying an intrinsic images model to an image to generate a linear system of equations in accordance with one or more implementations.

FIG. 3 illustrates an example 300 of applying intrinsic images model 106 to an image to generate a linear system of equations in accordance with one or more implementations.

In this example, fast intrinsic images application 104 applies intrinsic images model 106 to image 202. Intrinsic image model 106 includes local constraints 302 for both reflectance and shading, and non-local constraints 304 for reflectance. Applying local constraints 302 and non-local constraints 304 to image 202 generates a linear system of equations 306, which can be solved to generate reflectance intrinsic image 204 and shading intrinsic image 206.

Local Constraints

Local constraints 302 are constraints between neighboring pixels (e.g., top, left, right, and bottom) in image 202. The variation in the pixel values at neighboring pixels in image 202 is caused by variations in the reflectance and shading. In most cases, the variation is caused either by a change in only the reflectance (e.g., at texture boundaries) or by changes in only the shading (either because of changes in the geometry of the object or effects like shadows). If the change in the pixel value is solely due to a change in the reflectance, the shading should be the same at neighboring pixels. Conversely, if the image variation is because of a shading variation, the reflectance values at these pixels should be identical. Based on this observation, intrinsic images model 106 can construct a local error term on the reflectance and shading as follows:

$$E_l(p) = \sum_{q \in N(p)} w_l(p, q)[r(p) - r(q)]^2 + \sum_{q \in N(p)} (1 - w_l(p, q))[s(p) - s(q)]^2,$$

In this equation, N(p) denotes the spatial neighborhood of p, which may include either the four or eight connected neighbors. The weight $w_l$ is a reflectance similarity weight 308, discussed in more detail below, that captures the likelihood that pixels p and q have the same reflectance. A high value of $w_l(x,y)$ indicates that the pixels have the same reflectance and penalizes the difference r(p)−r(q) accordingly (which in turn forces the difference in the pixel values, i(p)−i(q), into the shading). Conversely a low weight for $w_l(x,y)$ allows large differences in reflectance, but forces the shading to be very similar.

In one or more implementation, intrinsic images model 106 can combine this local error term on reflectance and shading with i(p)=r(p)+s(p), which enables intrinsic images model 106 to eliminate the reflectance term to construct local constraint 302 for shading as follows:

$$E_l(p) = \sum_{q \in N(p)} w_l(p, q)[s(p) - s(q) - i(p) + i(q)]^2 +$$

-continued
$$\sum_{q \in N(p)} (1 - w_l(p, q))[s(p) - s(q)]^2.$$

Reflectance Similarity

As noted above, the error term in the local constraint for shading is dependent on reflectance similarity weight 308, indicated by $w_l$. Computing reflectance similarity weight 308 is nontrivial because it entails measuring the similarity of the unknown reflectance at two pixels.

In order to calculate reflectance similarity weight 308, intrinsic images model 106 generates a proxy image 310. If the color of the illumination in image 202 is uniform (e.g., the shading is grayscale), intrinsic images model 106 computes a chromacity of image 202, and uses the chromacity of image 202 as proxy image 310. The RGB chromacity of image 202 can be computed by intrinsic images model 106 using the following equation:

$$c_k(p) = \frac{I_k(p)}{\sum_k I_k(p)}, k \in r, g, b.$$

Then, given proxy image 310, indicated by c, the reflectance similarity weight 308 for pixels p and q can be computed using the following equation:

$$w_l(x, y) = \exp\left(-\frac{\|c(p) - c(q)\|^2}{2\sigma_r^2}\right)$$

In this equation, intrinsic images model 106 assumes that the similarity between the chromaticity at two pixels is representative of the similarity of their true reflectance. $\sigma_r$ is a user-specified parameter, referred to as the shading detail parameter, that controls how close the proxy value at two pixels need to be for them to be considered the same reflectance. In practice, the shading detail parameter acts as a way to control where to assign the detail in the image. A low value of $\sigma_r$ results in a detailed reflectance intrinsic image and a smooth shading intrinsic image, whereas a high value of $\sigma_r$ results in a smooth reflectance intrinsic image and a detailed shading intrinsic image.

While the chromaticity works as a reasonable proxy image 310 when the shading of the image is grayscale, it may not be ideal if the shading of image 202 is colored. The shading of image 202 may be colored if it includes lighting from two different illuminants which is particularly common in outdoor scenes, where sunlight is white to red in color while skylight is blue.

Thus, in one or more implementations, fast intrinsic images application 104 detects whether the shading of image 202 is grayscale. If fast intrinsic images application 104 determines that the shading is grayscale, then intrinsic images model 106 uses the chromacity of image 202 as proxy image 310, as discussed above. Alternately, if fast intrinsic images application 104 determines that the shading of image 202 is colored instead of grayscale, then fast intrinsic images application 104 requests user input in order to generate proxy image 310. More particularly, fast intrinsic images application 104 requests user input to specify two points on image 202 with the same reflectance, one of which is shadowed and the other of which is illuminated. Intrinsic images model 106 then determines proxy image 310 based on the specified two points, such as by using techniques described by *On the Removal of Shadows from Images*, by G. D. Finlayson, S. D. Hordley, C. Lu, and M. S. Drew, IEEE Trans. Pattern Anal. Mach. Intell. 28, 1, 590-68, 2006, to compute an illumination-invariant RGB image that is used as proxy image 310 (instead of the chromacity of image 202) to calculate the reflectance similarity weight 308 in the equation above.

Non-Local Constraints

Non-local constraints 304 are constraints between a pixel and a set of pixels in image 202. Real world scenes are typically made up of a small number of reflectances. Thus, intrinsic images model 106 generates non-local constraints 304 for the reflectance r(p) of image 202. Notably, intrinsic images model 106 does not generate non-local constraints for the shading of image 202.

In previous solutions, non-local constraints are formed by taking every pixel in an image and constructing non-local constraints using randomly chosen pixels in the image, or by taking every pixel and searching for pixels with similar textures and constructing non-local constraints using the pixels with similar textures.

In contrast, intrinsic images model 106 generates non-local constraints 304 between a pixel and a set of pixels. The set of pixels can be used when applying the non-local constraints for each pixel, which significantly speeds up the process because the same pixels in the set are used multiple times, instead of accessing different pixels each time. To generate the set of pixels used for the non-local constraints 304, intrinsic images model 106 uses a k-means algorithm to cluster the proxy image 310, generated previously, into a user-specified number of clusters, such as six clusters. Since proxy image 310 captures the differences in the reflectances in image 202, the resulting clusters share very similar reflectances. The k-means algorithm provides centroids of the clusters, $g_k$, $k \in 1, 2, \ldots, s$. Intrinsic images model 106 then locates the pixels in image 202 with proxy values closest to the centroids using the following equation:

$$t_k = \underset{i}{\operatorname{argmin}} \|c(t) - g_k\|^2, k \in 1, 2, \ldots, s.$$

Based on the assumption that the reflectance values in image 202 lie close to the values at these cluster pixels, it is enforced at every pixel p in image 202 by adding non-local constraints 304 for reflectance, using the following equation:

$$E_n(p) = \sum_k w_n(p, t_k)[r(p) - r(t_k)]^2 = \sum_k w_n(p, t_k)[s(p) - s(t_k) - i(p) + i(t_k)]^2$$

In this equation, $w_n$ is the reflectance similarity weight 308, computed above. Non-local constraints 304 force pixels that have proxy values that are close to the cluster pixels to have reflectances that are very similar.

Intrinsic images model 106 can then combine local constraints 302 and non-local constraints 304 with a relative weight λ, and solve for the shading that minimizes this combined energy term using the following equation:

$$s = \underset{n}{\operatorname{argmin}} \sum_p E_l(p) + \lambda \sum_p E_n(p).$$

The two parameters that control the result of this optimization are $\sigma_r$, used to compute the weights $w_l$ and $w_n$ (the shading detail) and λ that controls how strongly the non-local reflectance constraints are to be enforced.

This equation is a quadratic in terms of the unknown shading s. The optimal shading that minimizes this energy term can be computed by intrinsic images model 106 by differentiating it and setting the resulting functional to 0. Doing so generates linear system of equations 306, in the form: As=b. In linear system of equations 306, for an image with m pixels, s and b are vectors of length m, and A is an m×m matrix.

In one or more implementations, fast intrinsic images application 104 solves linear system of equations 306 using a direct linear solver to generate reflectance intrinsic image 204 and shading intrinsic image 206. However, as the size of image 202 increases, solving linear system of equations 306 using a direct linear solver becomes a computational bottleneck.

Thus, in one or more implementations, fast intrinsic images application 104 uses solver module 108 to solve linear system of equations 306 to determine the reflectance intrinsic image 204 and shading intrinsic image 206.

Multi-Scale Parallelized Iterative Solver

Figure 4:
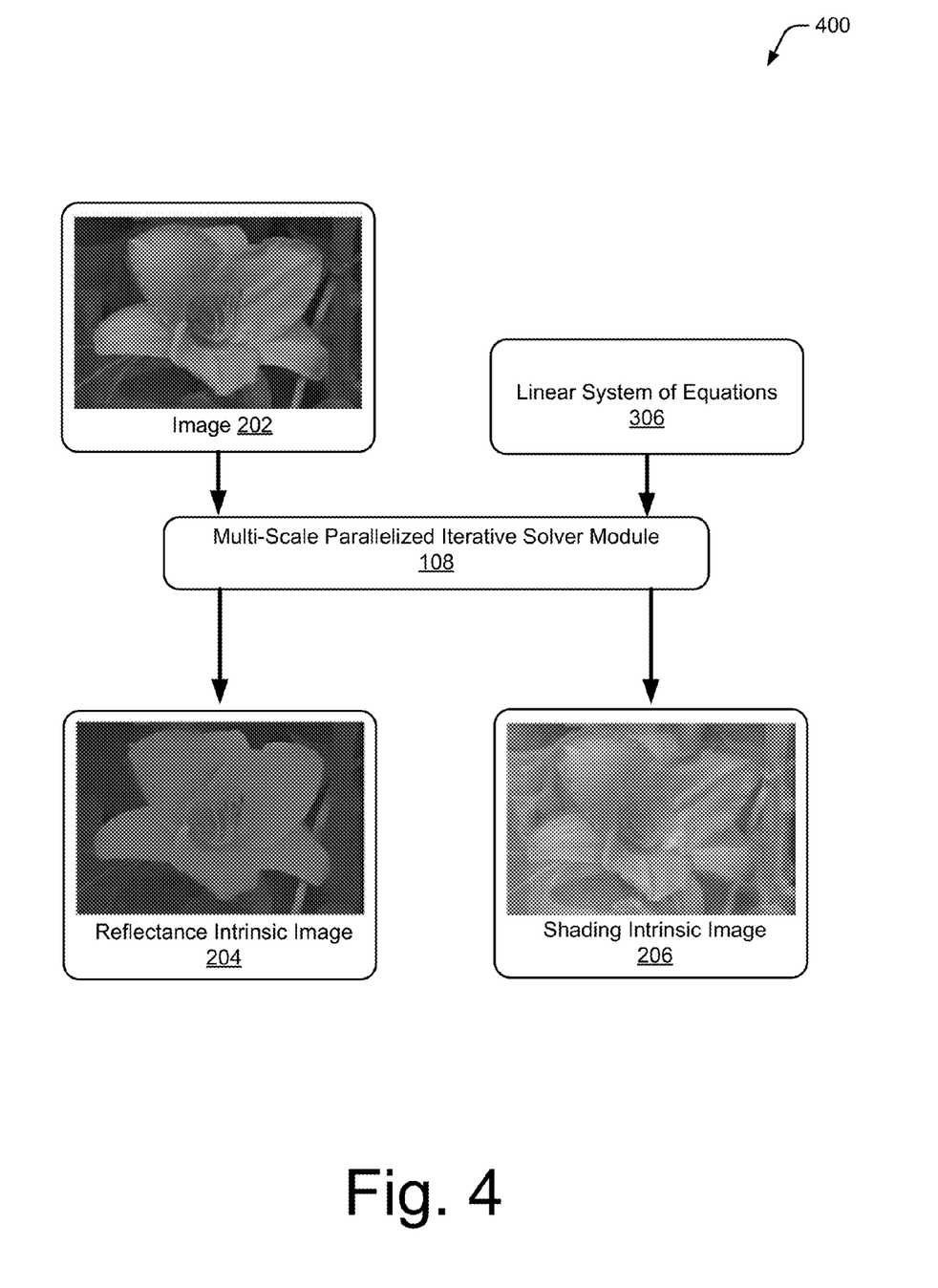
FIG. 4 illustrates a system in which a multi-scale parallelized iterative solver solves a linear system of equations to generate reflectance and shading intrinsic images for an image.

FIG. 4 illustrates a system 400 in which a multi-scale parallelized iterative solver solves a linear system of equations to generate reflectance and shading intrinsic images for an image.

In system 400, multi-scale parallelized iterative solver module 108 receives image 202 and the linear system of equations 306 generated by applying intrinsic images model 106 to image 202. Then, solver module 108 solves the linear system of equations 306 to generate reflectance intrinsic image 204 and shading intrinsic image 206. To do so, multi-scale iterative solver takes advantage of two features of the linear system of equations 306.

First, the linear system of equations 306, in the form As=b, is a very sparse linear system. For example, since each pixel has constraints that involve only pixels in its spatial neighborhood (either 4 or 8 pixels) and the k cluster pixels, there are a maximum of k+4 or k+8 non-zero entries in every row of A that corresponds to a non-cluster pixel. In addition, A is diagonally dominant because of the nature of the constraints. This enables solver module 108 to use an iterative method to solve linear system of equations 306. In one or more implementations, solver module 108 uses parallelized Jacobi iterations to solve linear system of equations 306.

Second, the shading layer, s, to be estimated for shading intrinsic image 206 is often smooth in an image. This means that solving for the shading on a low-resolution image and up-sampling provides a good approximation of the shading at a higher resolution. Based on this observation, solver module 108 uses a multi-scale optimization scheme.

Figure 5:
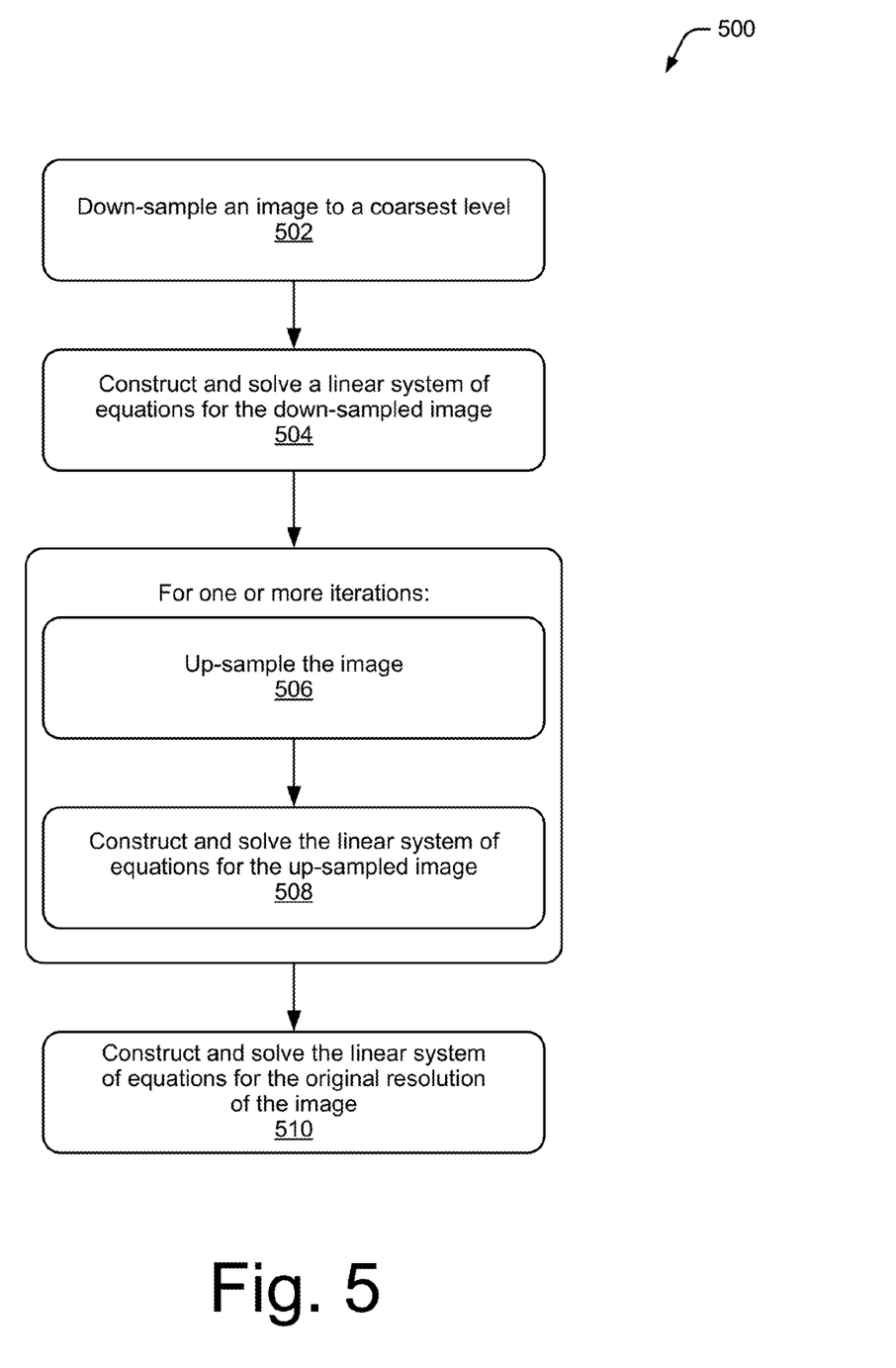
FIG. 5 illustrates a flow chart of an algorithm used by a multi-scale parallelized iterative solver to solve a linear system of equations.

FIG. 5 illustrates a flow chart 500 of an algorithm used by solver module 108 to solve a linear system of equations.

At 502, solver module 108 down-samples image 202 to a coarsest level. To do so, solver module 108 can build a pyramid for image 202 by progressively blurring image 202 with a Gaussian filter and down-sampling the blurred image 202 by a factor of 2 till the coarsest level of image 202 is reached (e.g., approximately 256 pixels).

At 504, solver module 108 constructs and solves linear system of equations 306 for the down-sampled image. As noted above, solving for the shading on a low-resolution image and up-sampling provides a good approximation of the shading at a higher resolution. Further, since linear system of equations 306 is very small at the coarsest level, solver module 108 may uses a direct linear solver to solve the linear system of equations 306 at the coarsest level, which makes this process very fast.

At 506, for one or more iterations, solver module 108 up-samples the image, and at 508 constructs and solves the linear system of equations for the up-sampled image. Note that solver module 108 has the results of the shading calculated at low resolution, and thus at each iteration, the shading can be refined at a higher level.

In one or more implementations, in order to further increase the speed of solving linear system of equations 306, solver module 108 uses parallelized Jacobi iterations. Solver module 108 may run a fixed number of Jacobi iterations to compute the shading intrinsic image at the higher levels of resolution. Solver module 108 continues the process of up-sampling, constructing, and solving the linear system of equations until the resolution of the original image is reached.

At 510, responsive to determining that the image has been up-sampled to an original resolution of the image, solver module 108 constructs and solves the linear system of equations for the original resolution of image. At this stage, the process is very fast because solver module 108 is simply refining the shading values calculated at the previous stages.

Solving the linear system of equations for the original resolution of image 202 enables solver module 108 to compute the log-shading s of the linear system of equations, As=b. The log-shading value s can then be exponentiated to compute the shading intrinsic image 206, where S=exp(s). Image 202 can then be divided by shading intrinsic image 206 to compute reflectance intrinsic image 204, R=I/S.

Notably, the combination of the multi-scale approach and the Jacobi iterations works particularly well because the distribution of details in the multi-scale pyramid construction is complementary to the convergence properties of Jacobi iterations. Jacobi iterations can resolve fine details very quickly but often take a very long time to resolve the low-frequency components of the signal they are trying to estimate. However, this low-frequency is captured very well at the lower resolutions of the pyramid and by up-sampling the shading from a lower resolution to a higher resolution, ensures that the Jacobi iterations converge quickly.

Further, the nature of local constraints 302 and non-local constraints 304 allows solver module 108 to use fast Jacobi iterations. For example, local constraints 302 involve each pixel communicating only with its spatial neighbors which means that memory access in the Jacobi iterations is very localized. In addition, non-local constraints 304 involve the same small set of cluster pixels. This allows solver module 108 to cache these values, which makes memory access much more efficient. This is a significant advantage over conventional solutions which build non-local reflectance constraints between random pixels in the image.

Example Procedure

The following discussion describes fast intrinsic image techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

Figure 6:
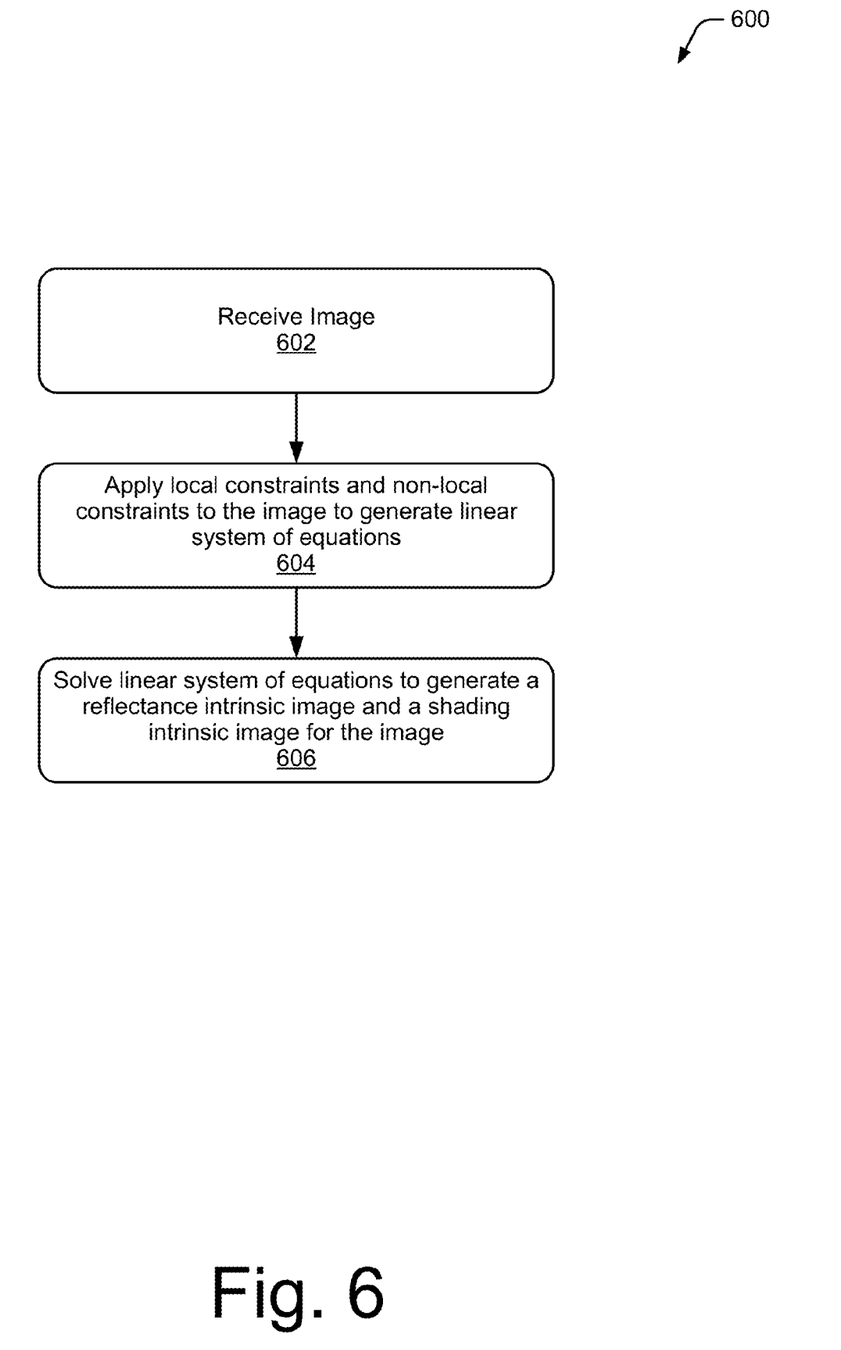
FIG. 6 illustrates a procedure in an example implementation in which a fast intrinsic images application generates reflectance and shading intrinsic images for an image.

FIG. 6 illustrates a procedure 600 $n$ an example implementation in which fast intrinsic images application 104 generates reflectance and shading intrinsic images for an image.

At 602, an image is received. For example, fast intrinsic images application 104 (FIG. 1) receives image 202 (FIG. 2).

At 604, local constraints and non-local constraints are applied to the image to generate a linear system of equations. For example, intrinsic images model 106 applies local constraints 302 and non-local constraints 304 to image 202 to generate linear system of equations 306 in the form of As=b.

At 606, the linear system of equations is solved to generate a reflectance intrinsic image and a shading intrinsic image for the image. For example, fast intrinsic images application 104 solves linear system of equations 306 to generate reflectance intrinsic image 204 and shading intrinsic image 206 for image 202. In some cases, fast intrinsic images application 104 may use a direct linear solver to solve linear systems of equations 306. In other cases, in order to speed up the process of solving linear system of equations 306, fast intrinsic images application 104 may use solver module 108 to solve linear system of equations 306.

Example System and Device

FIG. 7 illustrates an example system generally at 700 that includes an example computing device 702 that is representative of one or more computing systems and/or devices that may implement the various techniques described herein. This is illustrated through inclusion of fast intrinsic images application 104, which operates as described above. The computing device 702 may be, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving an image;
   determining, for each pixel in the image, local constraints for both reflectance variations and shading variations between the pixel and neighboring pixels adjacent to the pixel, the local constraints determined based on a value indicating a difference between a reflectance of the pixel and a reflectance of the neighboring pixels;
   determining, for each pixel in the image, non-local constraints for reflectance variations between the pixel and pixels in a set of pixels of the image, the set of pixels of the image being different than the neighboring pixels and the non-local constraints being different than the local constraints; and
   generating a reflectance intrinsic image for the image and a shading intrinsic image for the image by applying the local constraints for reflectance variations and shading variations and the non-local constraints for reflectance variations to the image.

2. The method of claim 1, further comprising determining a proxy image for the image, wherein determining the local constraints for reflectance variations and determining shading variations and the non-local constraints for reflectance variations are based at least in part on the proxy image.

3. The method of claim 2, wherein determining the proxy image is based on an assumption that shading of the image is grayscale.

4. The method of claim 3, wherein determining the proxy image further comprises determining a chromacity of the image.

5. The method of claim 2, further comprising:
   detecting that shading of the image is colored;
   requesting user input in response to detecting that shading of the image is colored; and
   determining the proxy image based at least in part on user input received in response to the request.

6. The method of claim 5, wherein the proxy image comprises an illumination-invariant RGB image.

7. The method of claim 5, wherein the requesting user input comprises requesting user input to specify two points on the image with the same reflectance where one of the two points is shadowed and the other one of the two points is illuminated.

8. The method of claim 1, wherein generating the reflectance intrinsic image and the shading intrinsic image is performed by combining the local constraints and the non-local constraints.

9. The method of claim 1, wherein generating the reflectance intrinsic image and the shading intrinsic image is performed using a direct linear solver.

10. The method of claim 1, wherein generating the reflectance intrinsic image and the shading intrinsic image is performed using a multi-scale parallel iterative solver.

11. The method of claim 10, wherein the multi-scale parallel iterative solver uses Jacobi iterations to generate the reflectance intrinsic image and the shading intrinsic image.

12. A method comprising:
    receiving an image;
    determining a reflectance intrinsic image for the image and a shading intrinsic image for the image by:
      down-sampling the image to a coarsest level;
      generating a reflectance intrinsic image and a shading intrinsic image for the down-sampled image based on a combination of:
        local constraints for both reflectance variations and shading variations between an area of the down-sampled image and neighboring areas adjacent to the area, the local constraints being based on a value indicating a difference between a reflectance of the area and a reflectance of the neighboring areas; and
        non-local constraints for reflectance among areas of the down-sampled image, the local constraints being different than the non-local constraints;
      for at least one iteration, up-sampling the down-sampled image, and generating a reflectance intrinsic image and a shading intrinsic image for the up-sampled image; and
      responsive to determining that the down-sampled image has been up-sampled to an original resolution of the image, generating the reflectance intrinsic image for the image and the shading intrinsic image for the image based on the original resolution of the image; and
    outputting the determined reflectance intrinsic image and the shading intrinsic image.

13. The method of claim 12, wherein Jacobi iterations are used for the at least one iteration to generate the reflectance intrinsic image and the shading intrinsic image for the up-sampled image.

14. The method of claim 12, wherein generating the reflectance intrinsic image for the image and the shading intrinsic image for the image includes determining a log shading value for the image.

15. The method of claim 14, further comprising determining the shading intrinsic image by exponentiating the log shading value.

16. The method of claim 15, further comprising determining the reflectance intrinsic image by dividing the image by the shading intrinsic image.

17. A system comprising:
    a processor; and
    at least one computer readable storage media having instructions stored thereon that are executable by the processor to perform operations comprising:
      receiving an image;
      generating a reflectance intrinsic image for the image and a shading intrinsic image for the image by applying an intrinsic images model to the image, the intrinsic images model comprising local constraints for both reflectance variations and shading variations between a pixel of the image and neighboring pixels adjacent to the pixel, and non-local constraints for reflectance variations among pixels of the image, the local constraints being different from the non-local constraints and based on a value indicating a difference between a reflectance of the pixel and a reflectance of the neighboring pixels; and
      outputting the generated reflectance intrinsic image and shading intrinsic image.

18. The system of claim 17, wherein generating the reflectance intrinsic image for the image and the shading intrinsic image for the image comprises:
   down-sampling the image to a coarsest level;
   determining a shading value for the down-sampled image; and
   refining the shading value by up-sampling the image, for one or more iterations, and generating a reflectance intrinsic image for the up-sampled image and a shading intrinsic image for the up-sampled image using Jacobi iterations.

19. The system of claim 17, the operations further comprising:
   generating an edited reflectance intrinsic image in response to receiving user input indicating a change to the reflectance intrinsic image for the image; and
   generating an edited image by combining the edited reflectance intrinsic image with the shading intrinsic image for the image.

20. The system of claim 17, wherein the value indicating the difference between the reflectance of the pixel and the reflectance of the neighboring pixels is inversely proportional to the difference between the reflectance of the pixel and the reflectance of the neighboring pixels.

* * * * *